(12) United States Patent
Hawkins et al.

(10) Patent No.: US 7,727,350 B2
(45) Date of Patent: Jun. 1, 2010

(54) APPARATUS AND METHOD FOR MAKING ARTICLES HAVING FILAMENTARY MATERIAL

(75) Inventors: David N. Hawkins, Macedon, NY (US); Grant E. Wylie, Hemlock, NY (US)

(73) Assignee: Ultrafab, Inc., Farmington, NY (US)

( * ) Notice: Subject to any disclaimer, the term of this patent is extended or adjusted under 35 U.S.C. 154(b) by 514 days.

(21) Appl. No.: 11/793,246

(22) PCT Filed: Dec. 17, 2004

(86) PCT No.: PCT/US2004/043314

§ 371 (c)(1),
(2), (4) Date: Jun. 15, 2007

(87) PCT Pub. No.: WO2006/065254

PCT Pub. Date: Jun. 22, 2006

(65) Prior Publication Data

US 2008/0105364 A1      May 8, 2008

(51) Int. Cl.
*B32B 37/00*         (2006.01)
(52) U.S. Cl. .................. 156/174; 156/177; 156/433; 156/441
(58) Field of Classification Search .................. 156/174, 156/177, 178, 179, 173, 433, 435, 439, 440, 156/441
See application file for complete search history.

(56) References Cited

U.S. PATENT DOCUMENTS

| 1,895,293 | A |   | 1/1933  | Morton |
| 3,041,230 | A |   | 6/1962  | Deihl |
| 3,649,411 | A |   | 3/1972  | Bolles |
| 3,921,265 | A |   | 11/1975 | Eschenbach |
| 4,022,642 | A |   | 5/1977  | Abel |
| 4,148,953 | A |   | 4/1979  | Horton |
| 4,302,494 | A |   | 11/1981 | Horton |
| 4,576,672 | A | * | 3/1986  | Kobayashi et al. .......... 156/177 |
| 5,338,382 | A |   | 8/1994  | Johnson et al. |
| 5,965,262 | A | * | 10/1999 | Whisler et al. ............... 428/373 |
| 6,096,151 | A |   | 8/2000  | Edwards et al. |
| 6,252,757 | B1 |  | 6/2001  | Loughney et al. |

* cited by examiner

*Primary Examiner*—Jeff H Aftergut
(74) *Attorney, Agent, or Firm*—Kenneth J. Lukacher; Martin Lukacher

(57) ABSTRACT

Articles (12) made by winding of filamentary material (11), such as yarn and thread, are especially suitable for providing brushes and pile weatherstripping. In order to enable the yarn (11) to be unwound and payed out of spools (24) disposed in a stationary or static array, the yarn is fed from the spools (24) through a rotating spindle (30). A frame (14) located at the beginning of the path and may be provided by laterally spaced pairs of wire (52) which travel around posts (36) provided by rollers on a stationary bracket (38). In order to support the bracket (38) and the frame (14), a shaft (28) reciprocates a pair of support rods (100, 102) in synchronism with the rotation of the spindle (30). Bindings (60, 62) are applied to the ends of the loops (54) as they leave the winding station (14). Slitters (20) divide the loops (54).

29 Claims, 18 Drawing Sheets

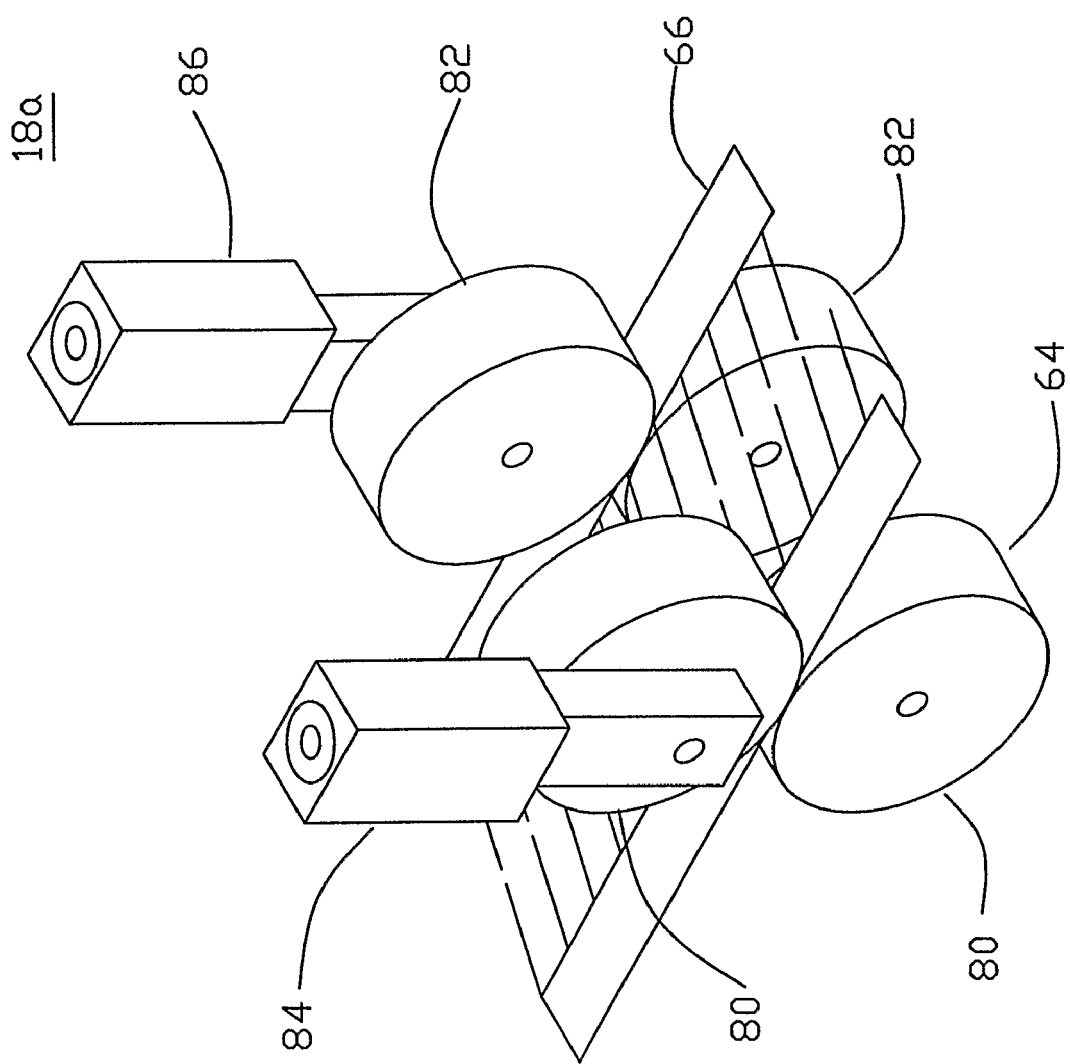

APPARATUS AND METHOD FOR MAKING ARTICLES HAVING FILAMENTARY MATERIAL

The present invention relates to methods and apparatus for making articles of filamentary material and more particularly by winding such material. The invention is especially suitable for making brushes and pile articles such as weatherstripping. An especially useful article which may be made using the invention is a static brush suitable for handling electric charges so as to obtain static energy control, especially the discharge of static electricity collected by webs and other non-conductive members in web (for example, paper) handling machines.

Static brushes and methods and apparatus for fabricating same are discussed in Loughney et al., U.S. Pat. No. 6,252,757, issued Jun. 26, 2001. The present invention provides apparatus and methods for making static brushes and other articles by winding filamentary material which are improvements over the apparatus and methods described in the Loughney et al. patent, and it is a feature of this invention to provide such improved methods and apparatus. The invention is also suitable for making pile articles such as pile weatherstripping which methods and apparatus provide for the winding of filamentary material especially yarn and thread, to provide a pile. Such pile articles as may provide weatherstripping are described in Horton, U.S. Pat. No. 4,148,953, issued Apr. 10, 1979, and U.S. Pat. No. 4,302,494, issued Nov. 24, 1981, and by Johnson et al., U.S. Pat. No. 5,338,383, issued Aug. 16, 1994. These patents show examples of such pile weatherstripping and methods and apparatus for making same. Pile weatherstripping, which may be made by methods and apparatus provided by the invention, may also be of the type described in U.S. Pat. No. 6,711,858, issued Mar. 20, 2004, to James V. Albanese and David N. Hawkins.

While the methods and apparatus for making articles by winding filamentary material, and particularly weatherstripping, have been successfully used in commercial production of such articles by Ultrafab, Inc. of Farmington, N.Y. They have relied upon a moving frame or mandrel on which the filamentary material has been wound. Other methods of making windings have used other forms of moving frames and are discussed in the above referenced Albanese and Hawkins patent, namely Abel, U.S. Pat. No. 4,022,642, issued May 10, 1977, and Morton, U.S. Pat. No. 1,895,293, issued Jan. 24, 1933. The delivery of the filamentary material to provide the windings has involved rotating the spools or reels from which the filamentary material is drawn to make the windings, or movement of a spindle along as well as around a mandrel or frame on which the filamentary material is wound. As will be apparent from the above referenced patents, such movement requires rotation and in some cases translation of the spools and winding mechanism. The rate of production of product is adversely affected because the entire machine must be shut down to change spools and the weight of the spools and winding mechanism can limit the number of filaments (strands of yarn or thread). Also the number of spools or the capacity thereof which can practically be handled in the manufacturing process and apparatus is limited in the machines described in the above referenced patents. It is also desirable to eliminate the traveling endless mandrel or frame for carrying the wound product during the various stages of the manufacturing process. Without such moving carriers it may be possible to increase the rate of production of product, as well as reduce the size (and therefore the factory space required) for the machines which manufacture products by winding filamentary material.

Accordingly it is the principal object of the present invention to provide methods and apparatus for making articles of filamentary material which involve the winding of the material in order to make the manufacturing process more efficient, faster and effective than with equipment heretofore used for making such articles.

It is another object of the present invention to improve methods and apparatus for making articles involving winding of filamentary materials which are more effective, efficient, faster and compact than apparatus heretofore provided by avoiding the use of rotating spools and moving mandrels or frames on which loops of the windings are wound.

It is a more specific object of the present invention to provide improved apparatus for making brushes, pile weatherstripping and like articles.

Briefly described, apparatus for making articles and windings of filamentary material in accordance with the invention makes use of a frame or platform on which the material is wound. This frame is statically or stationarily supported at one end of a path having a plurality of stations, including a winding station having the frame at the beginning or upstream end of the path and other stations for assembling the windings into a band, splitting the band into plurality of bands each with a part of the winding and transporting product constituted by the bands to the end of the path to provide the output product of the apparatus. At the winding station, a spindle is rotatable around the frame and has an end from which filamentary material is released to form the windings. The frame is supported in non-interfering relationship with the spindle and from other elements between spools from which filamentary material is drawn into the spindle.

An exemplary embodiment of the invention for making static, discharge or elimination brushes is described hereinafter in accordance with the invention. Then the frame may be provided by conductive wires which are carried with the windings and bound together into the bands. The wire then provides a conductive discharge path for static electricity which is picked up by the brushes (the later being made of strands of conductive material). Such brushes being of the type described in the above referenced Loughney et al., U.S. Pat. No. 6,252,757. It will be appreciated that other designs for a stationary winding frame platform at the beginning of the path, where the process of manufacture is carried out, and other bindings than the bindings of tape material described in the herein illustrated embodiment of the invention for making static elimination brushes, may be provided in accordance with the invention.

The foregoing and other objects, features and advantages of the invention will become more apparent from a reading of the following description in connection with the accompanying drawings, which are briefly described as follows:

FIG. 8 is a perspective view illustrating the mechanism for supporting pressure rollers which provide guidance and for the application of the binding tape in the apparatus shown in FIGS. 1-4;

Figure 1:
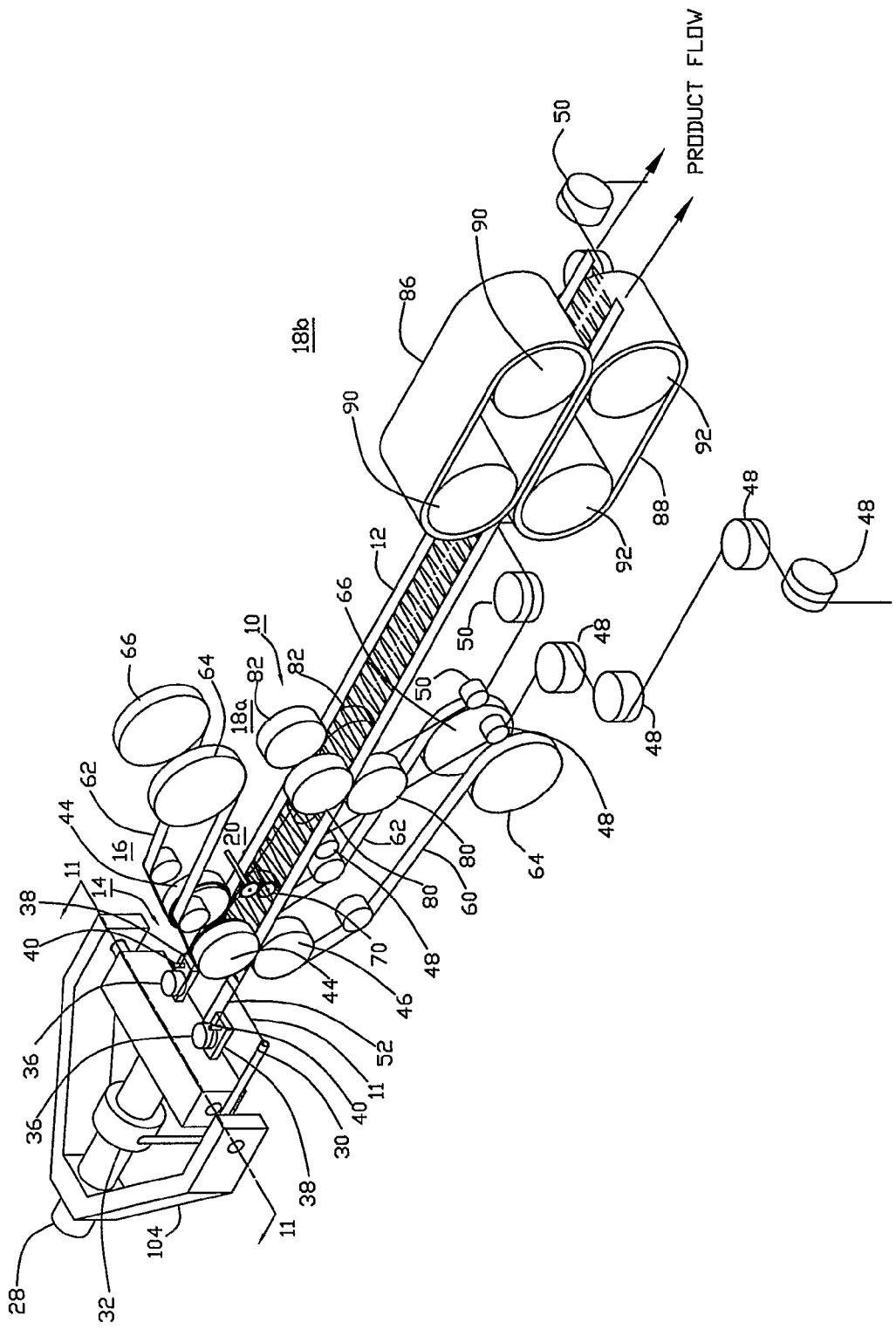
FIG. 1 is a perspective view schematically illustrating apparatus provided by the invention.
Figure 2:
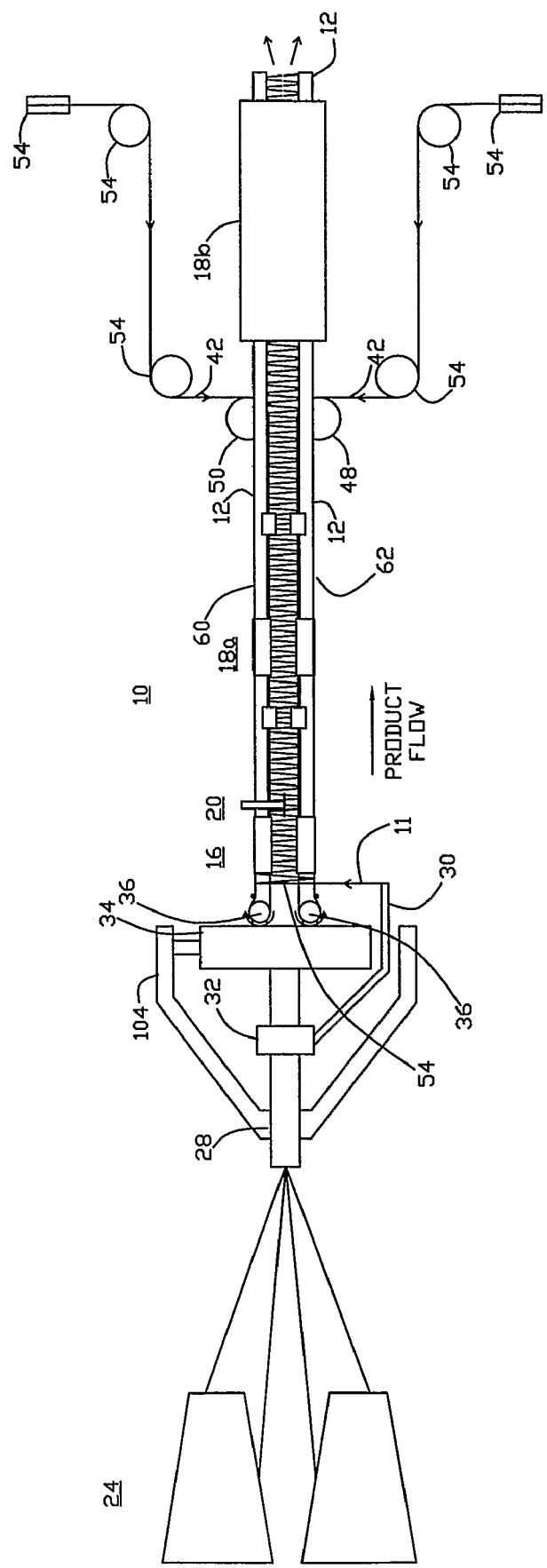
FIG. 2 is a plan view of the apparatus shown in FIG. 1.
Figure 2A:
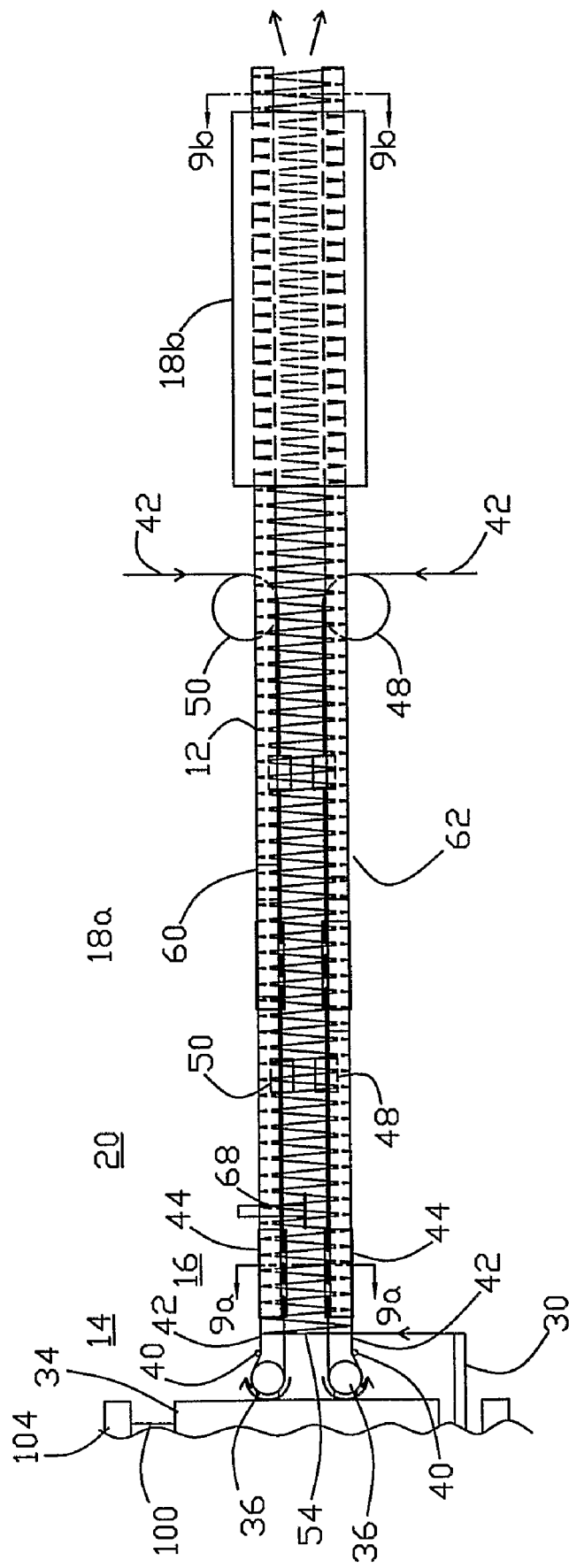
FIG. 2A is a plan view of an enlarged portion FIG. 2.
Figure 3:
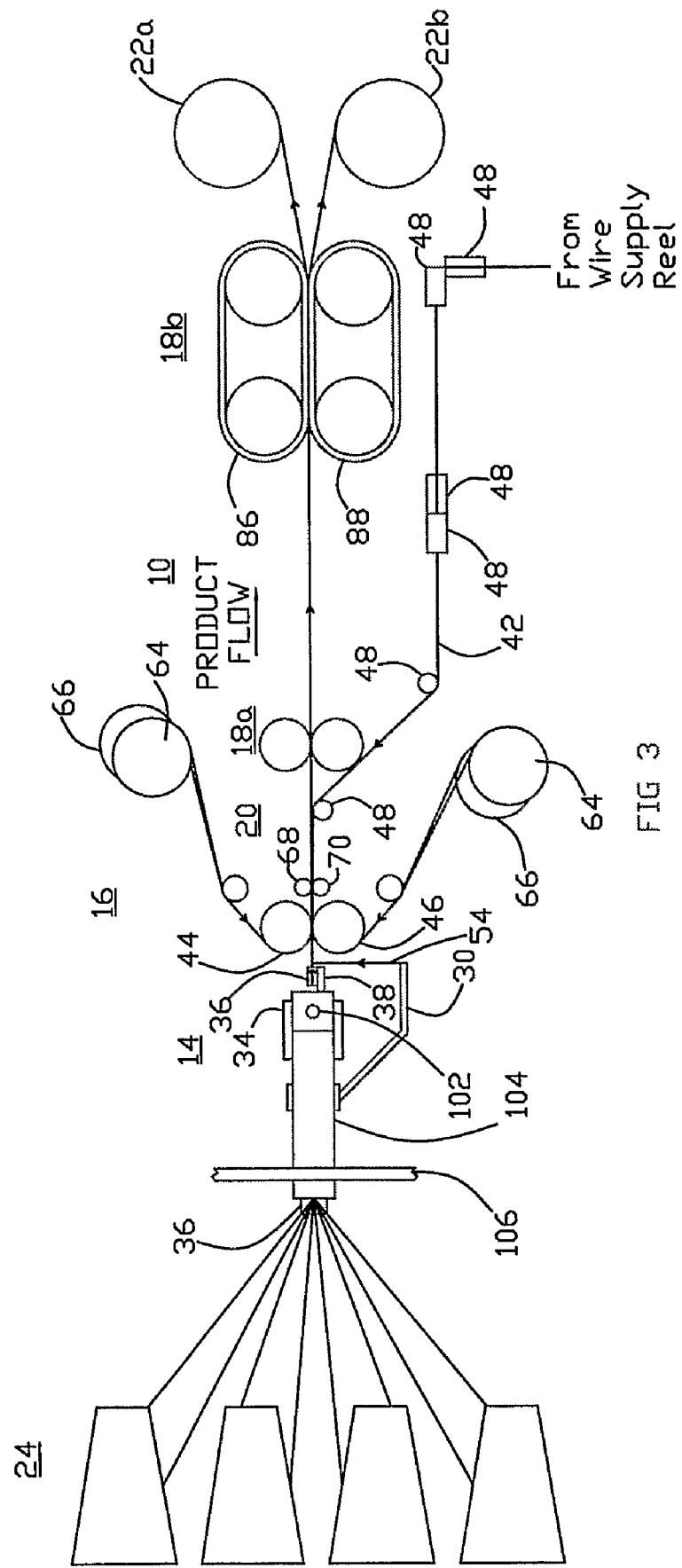
FIG. 3 is an elevational view of the apparatus shown in FIGS. 1 and 2.
Figure 4:
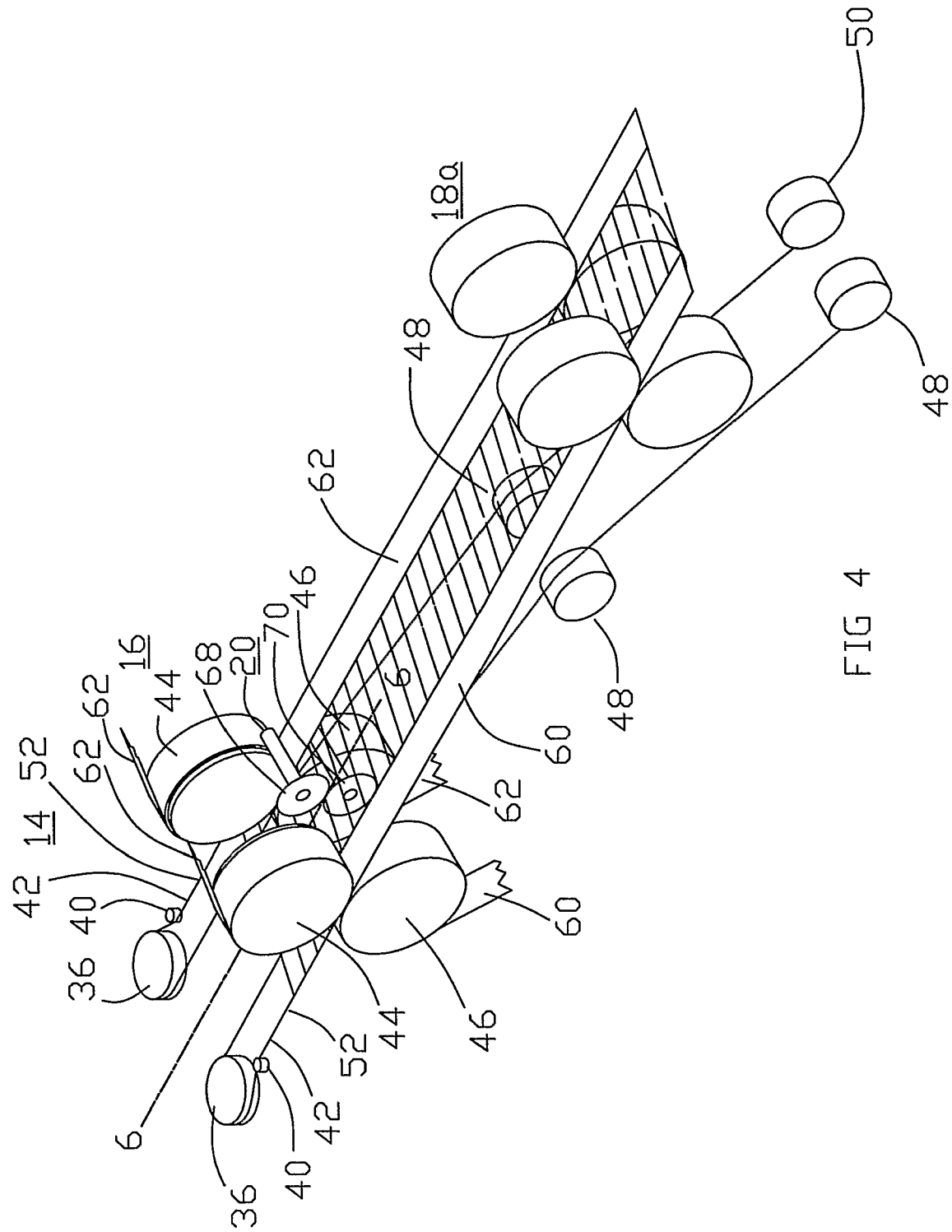
FIG. 4 is a perspective view schematically illustrating the winding station and the binding station and one of the stations to facilitate transport of the product.
Figure 7:
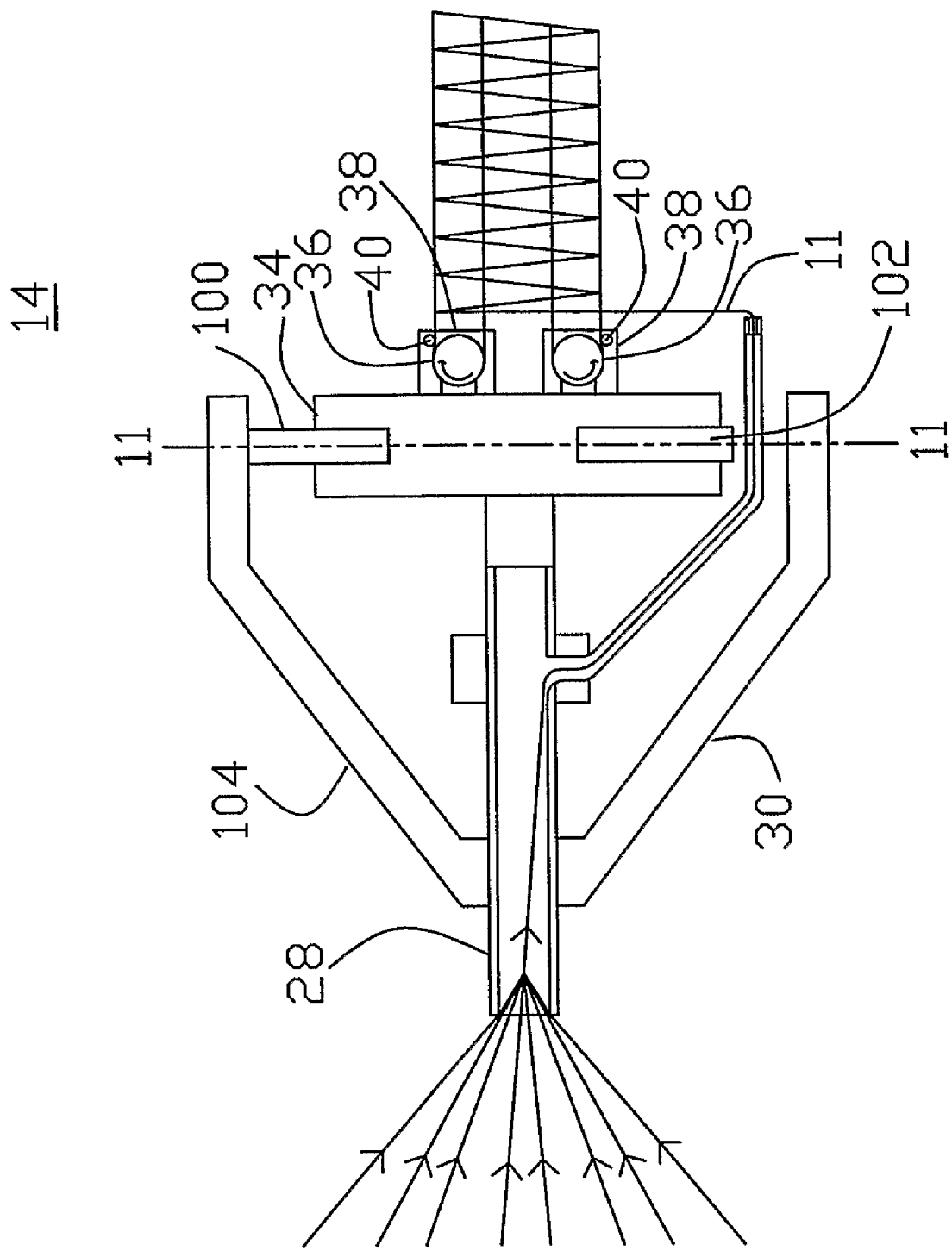
FIG. 7 is a plan view illustrating the stationary roller posts defining part of the winding station, and also the mechanism for supporting these posts, and also showing the spindle mechanism.
Figure 9A:
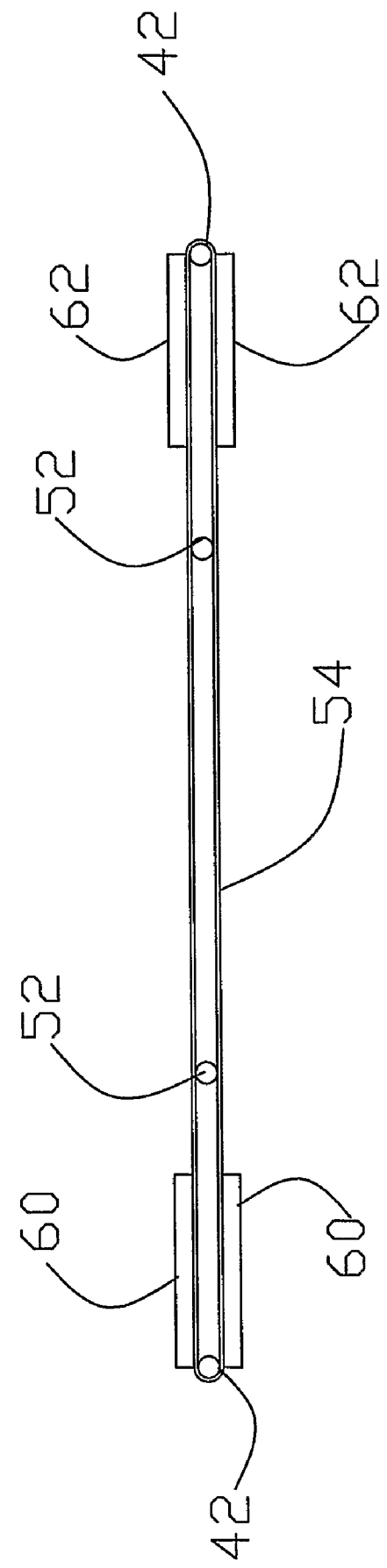
Figure 9B:
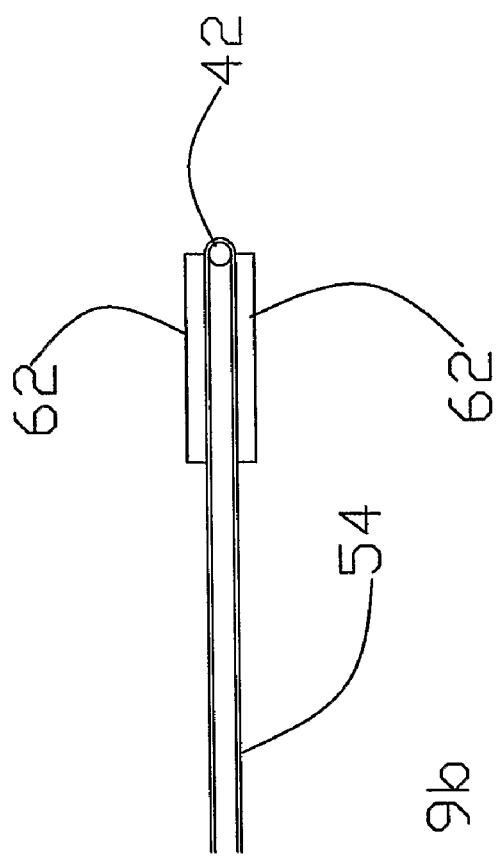
Figure 10:
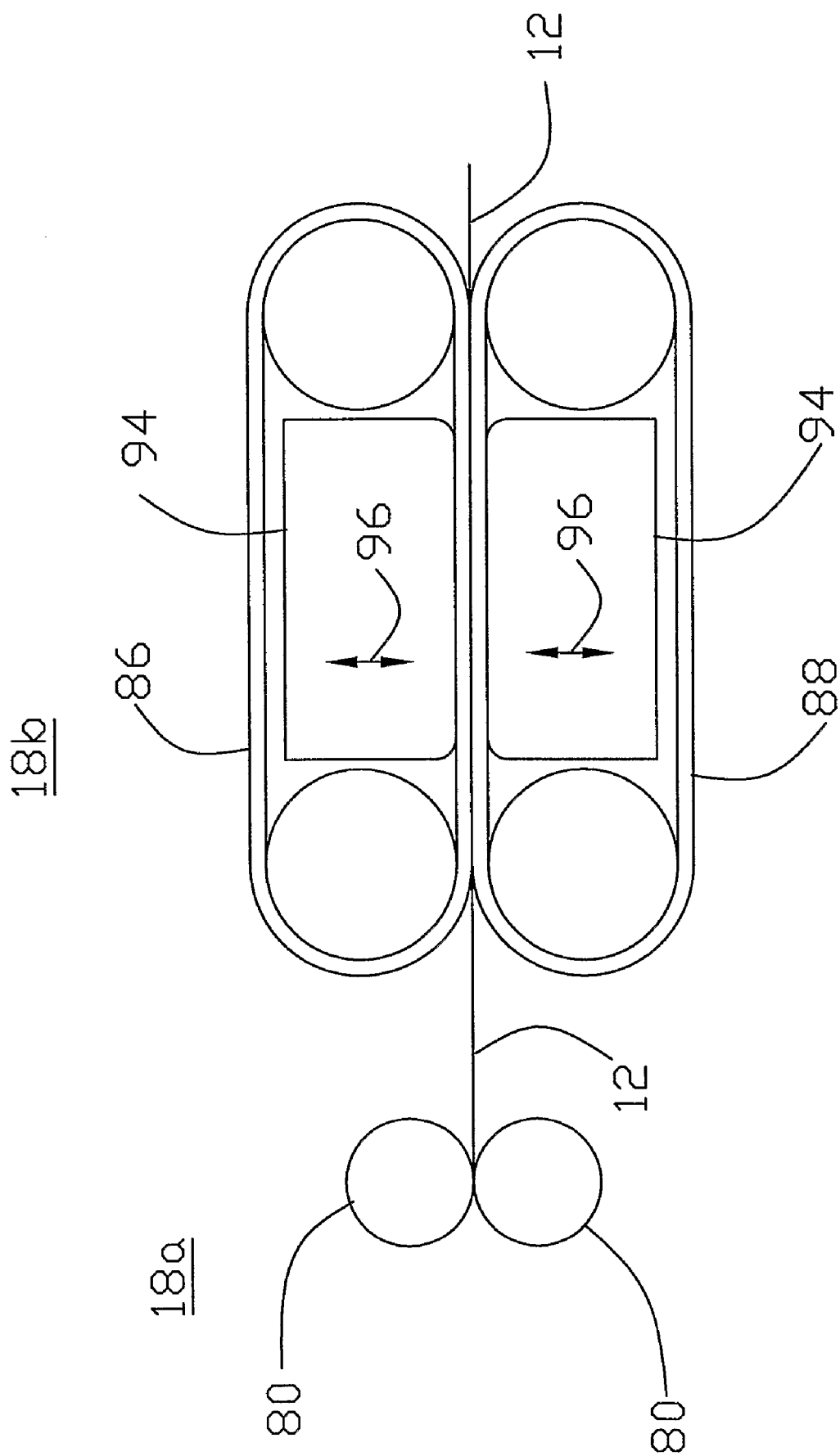
Figure 11:
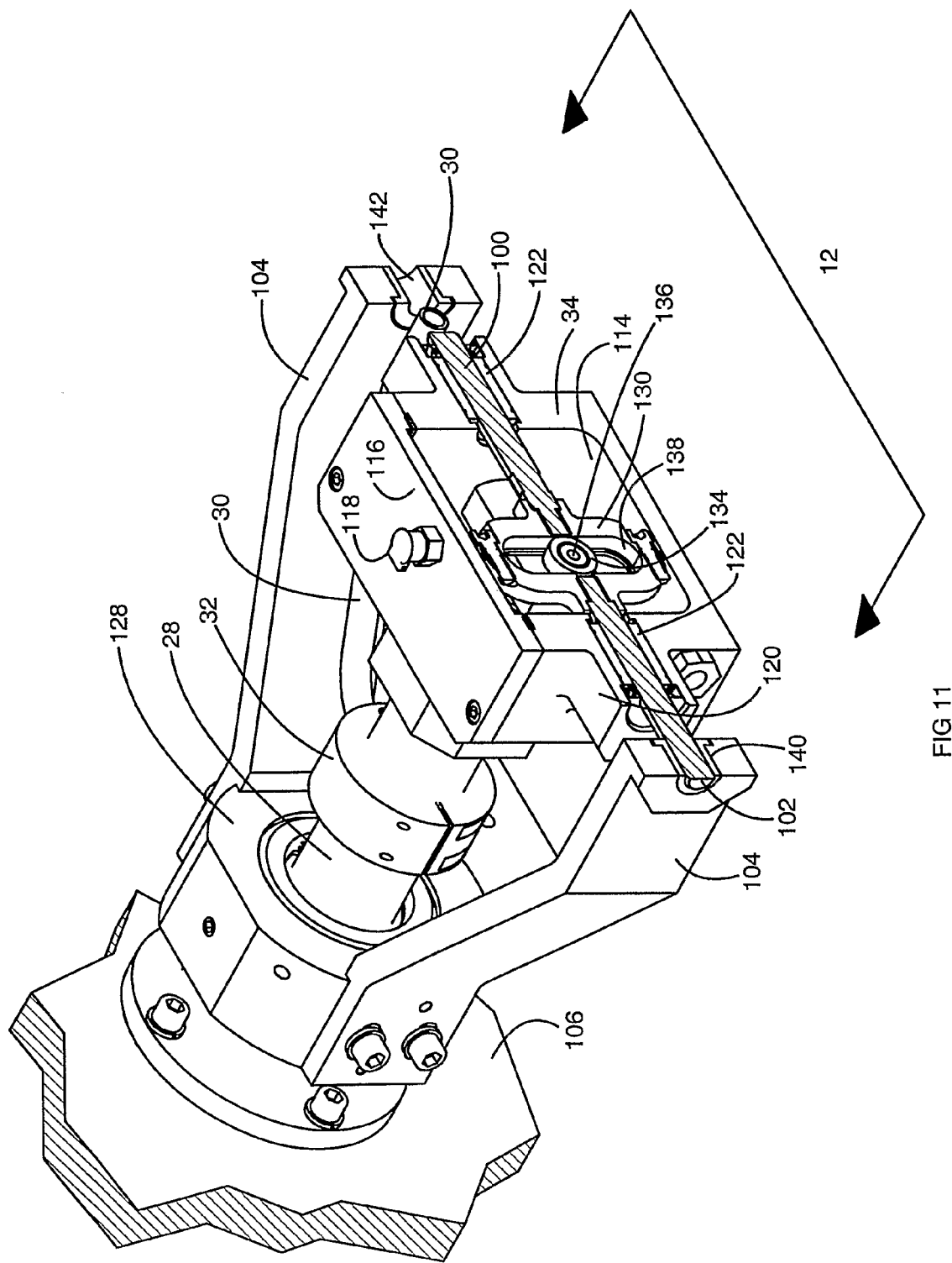
Figure 12:
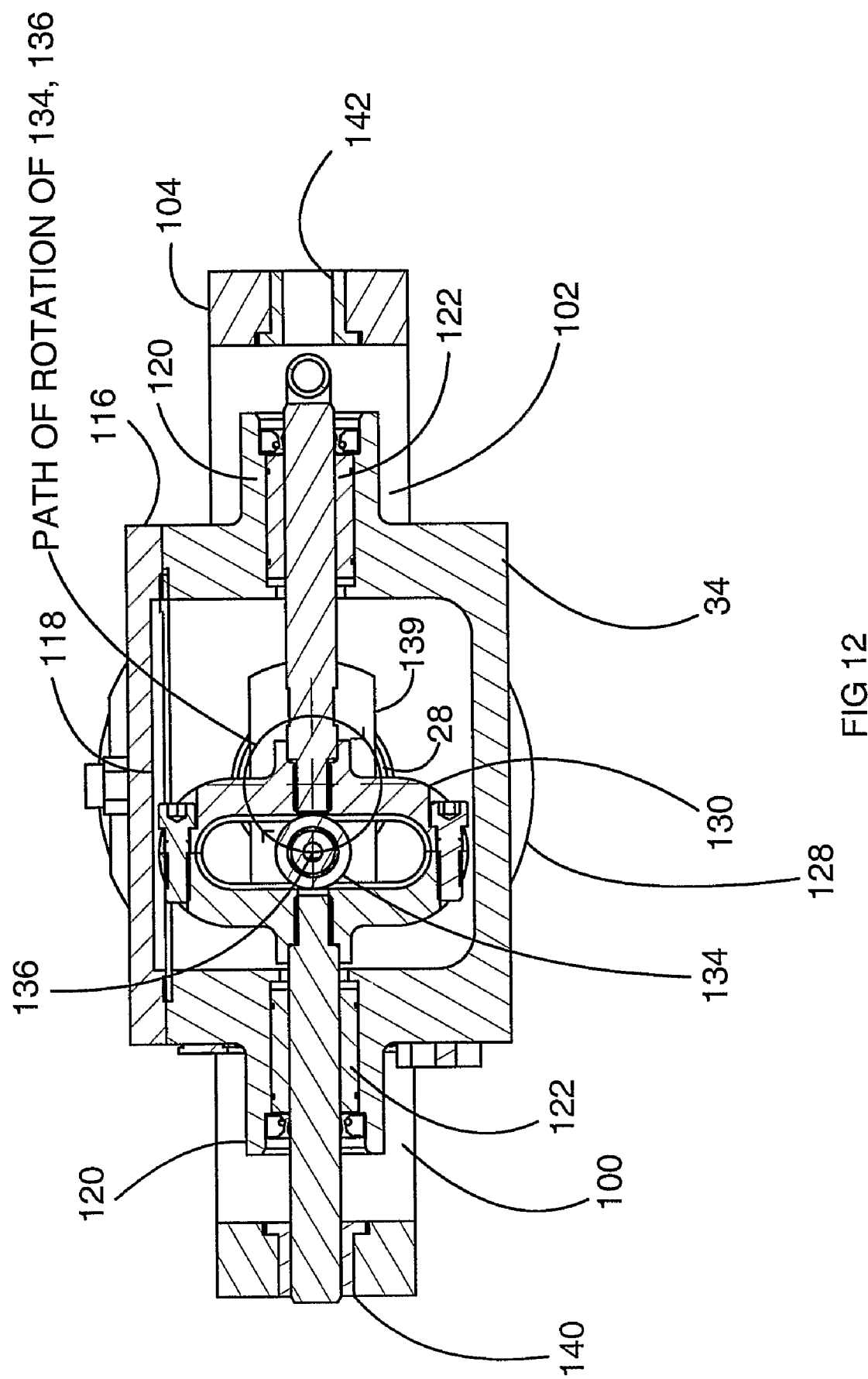
Figure 13:
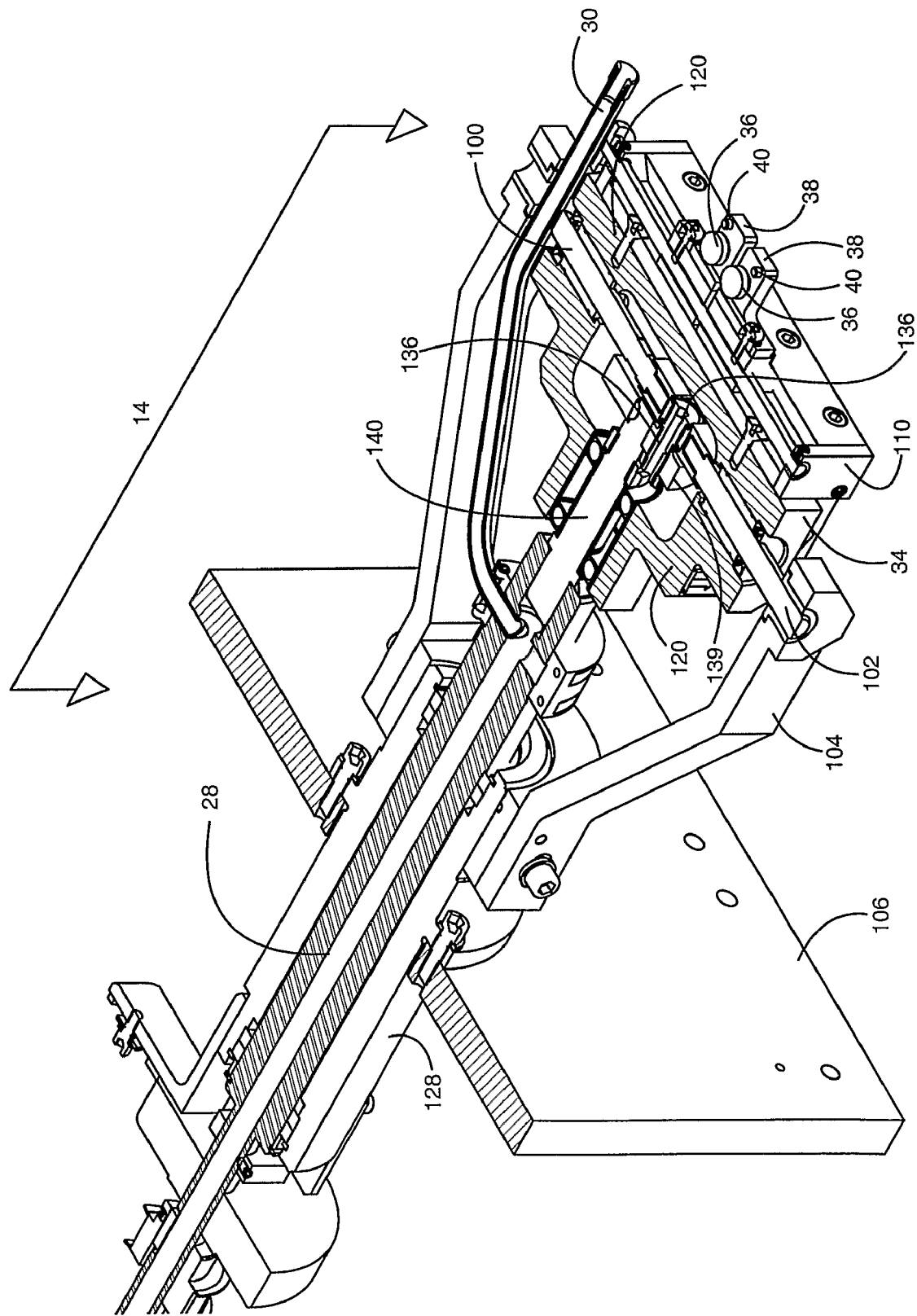
Figure 14:
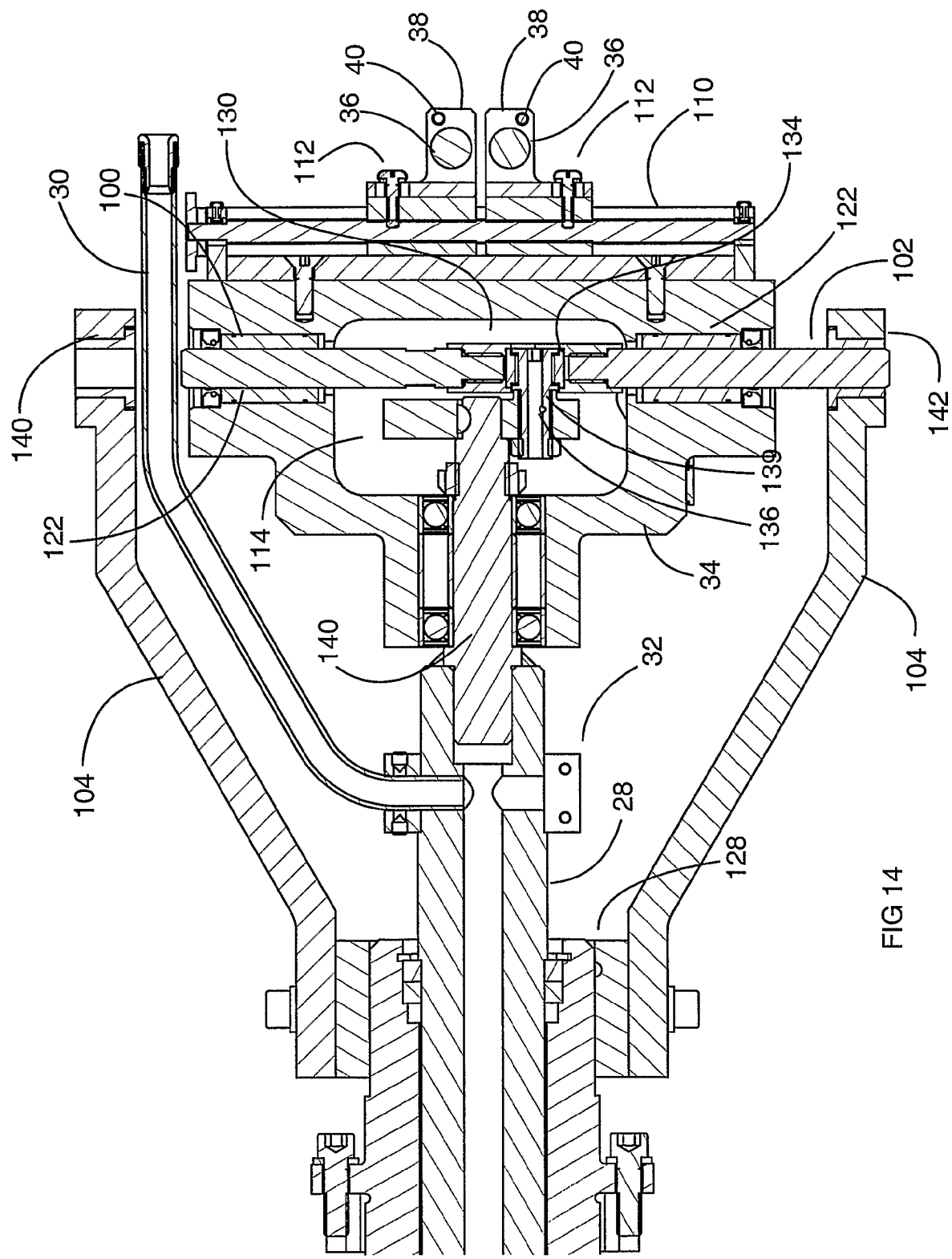

FIGS. 9a and 9b are sectional views of the product during the application of the binding tape (FIG. 9a) and the finished product after the transport station (FIG. 9b), the views being taken in FIG. 2A along the lines 9a-9a and 9b-9b in the direction of the arrows;

FIG. 10 is an elevational view illustrating the stations having the last application rollers which are shown in FIGS. 1-4 and FIG. 8 (but without the pressure applying mechanism on those rollers and also the belt driver which is shown in FIGS. 1-3; and FIGS. 11-14 illustrate the mechanism for supporting statically (stationary without moving) the winding station and yet permitting non-interfering rotation of the spindle, FIG. 13 being taken along the line 11-11 in FIG. 1 and FIG. 7, FIG. 12 being taken along line 12-12 in FIG. 11, FIG. 13 being taken along the line 13-13 also in FIG. 11, and FIG. 14 being taken along line 14-14 in FIG. 13 in the direction of arrows crossing line 14-14.

Referring in greater detail to FIGS. 1, 2, 2A and 3, there is shown apparatus 10, which provides an exemplary embodiment of the invention, and which is especially adapted for making static brushes. These brushes are made in the course of a manufacturing process which is carried out by a plurality of stations disposed along the path of travel or product flow path, indicated by the legend and arrows in FIGS. 1 and 3, of the product 12 in the process of manufacture thereof in the apparatus. At the beginning or the upstream end of the path is the winding station 14. This winding station is followed by the binding station 16 which binds the windings into a band. Next is a slitting station 20 which separates the band into a pair of brushes each having half of the loops of the winding. A driving or transport station 18 has two parts, one of which 18a has a pair of rollers which maintain the parts of the band together as they are driven outward from the outlet end of the machine past opposed belts providing another part 18b of the driving station. At the outward end of the machine there may be reels 22a and 22b for each half of the band which constitutes the product 12.

Figure 1A:
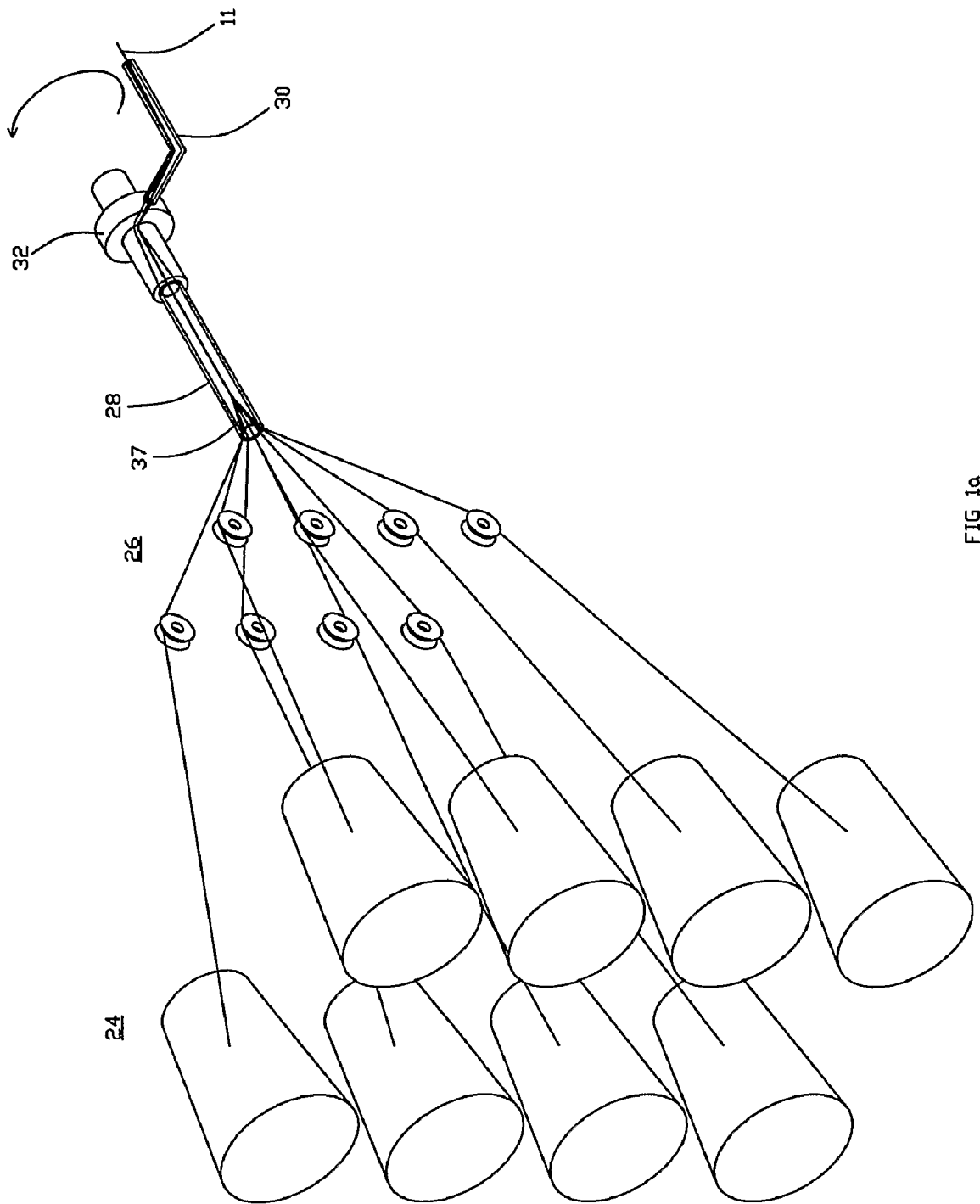
FIG. 1A is a perspective view schematically illustrating the arrangement of the spools of yarn and the spindle of the apparatus shown in FIG. 1.

The filamentary material 11 is drawn from an array of spools 24 (see also FIG. 1a). The threads from these spools are guided by flanged rollers 26 into a tubular shaft 28 which has a winding spindle 30 attached by a collar 32 to the shaft 28. The threads are combined by a tapered opening 37 into a composite strand which is fed through the spindle 30. The composite threads or yarn provide the pile or bristles which carry the static electricity. They are preferably of some conductive material. For example, copper sulfate impregnated acrylic fibers may be used to provide the yarn and payed out of the spools. Other conductive materials may be suitable, for example, fibers containing carbonaceous material or can be twisted, fine steel wire fibers.

Figure 5:
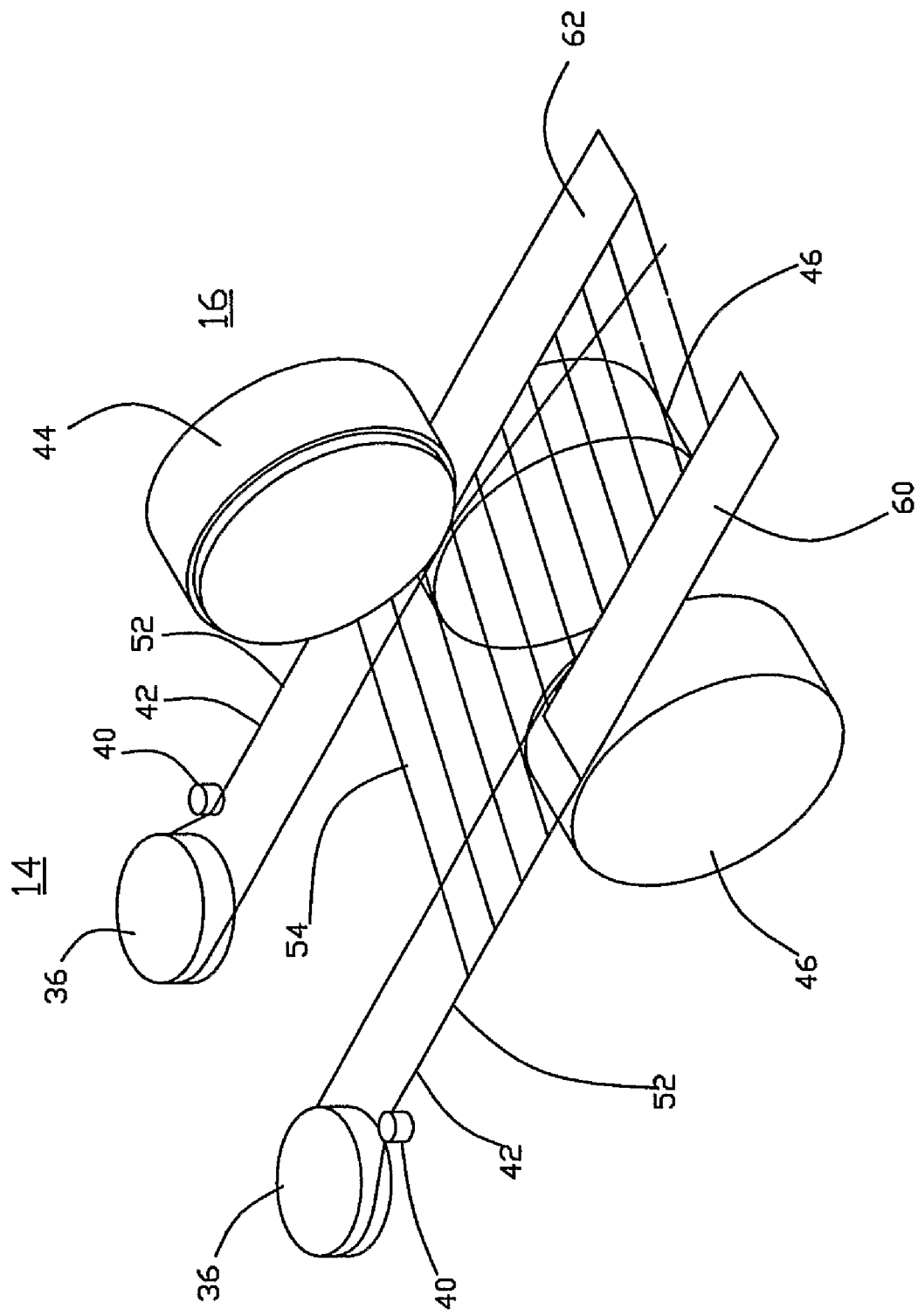
FIG. 5 is an enlarged view of part of FIG. 4 showing the winding station and parts of the binding station.
Figure 6:
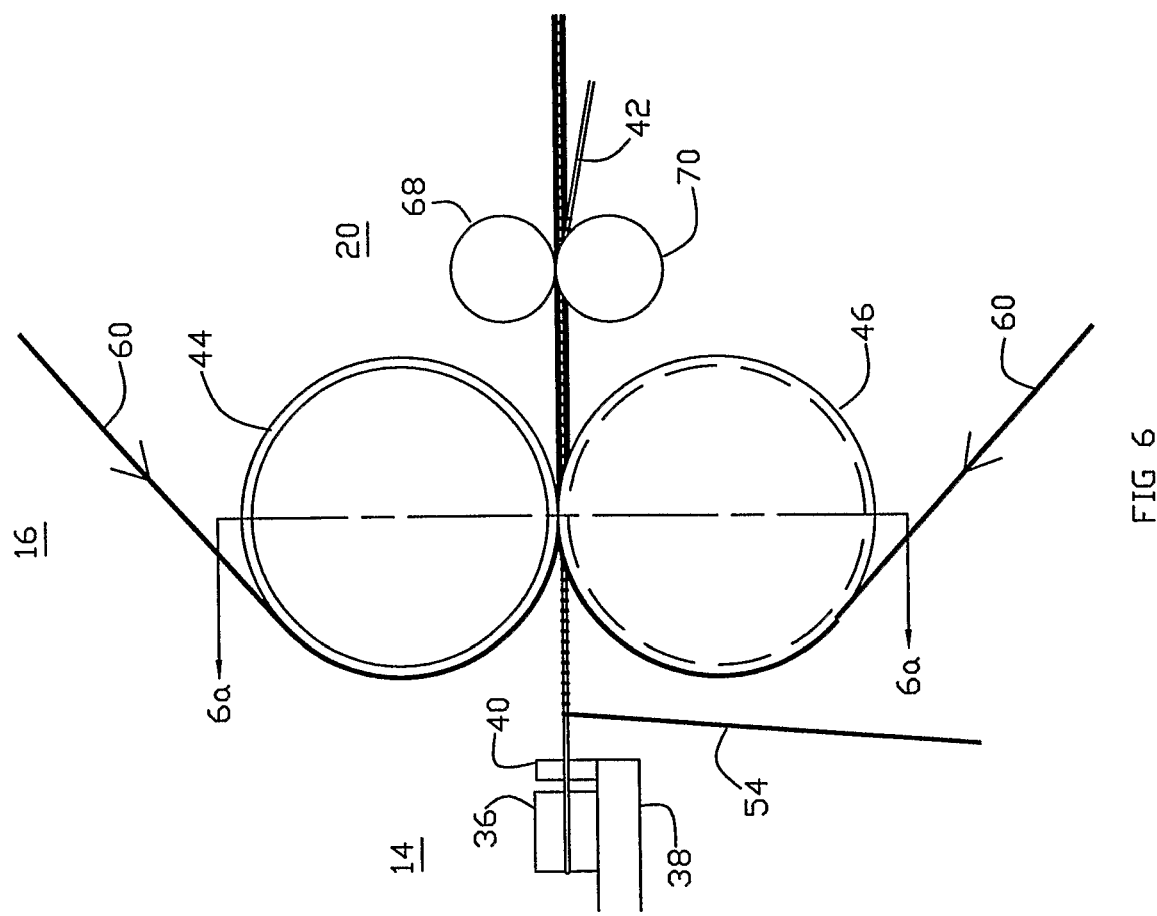
FIG. 6 is a sectional elevational view taken along the line 6-6 in FIG. 4 in the direction of the arrows.
Figure 6A:
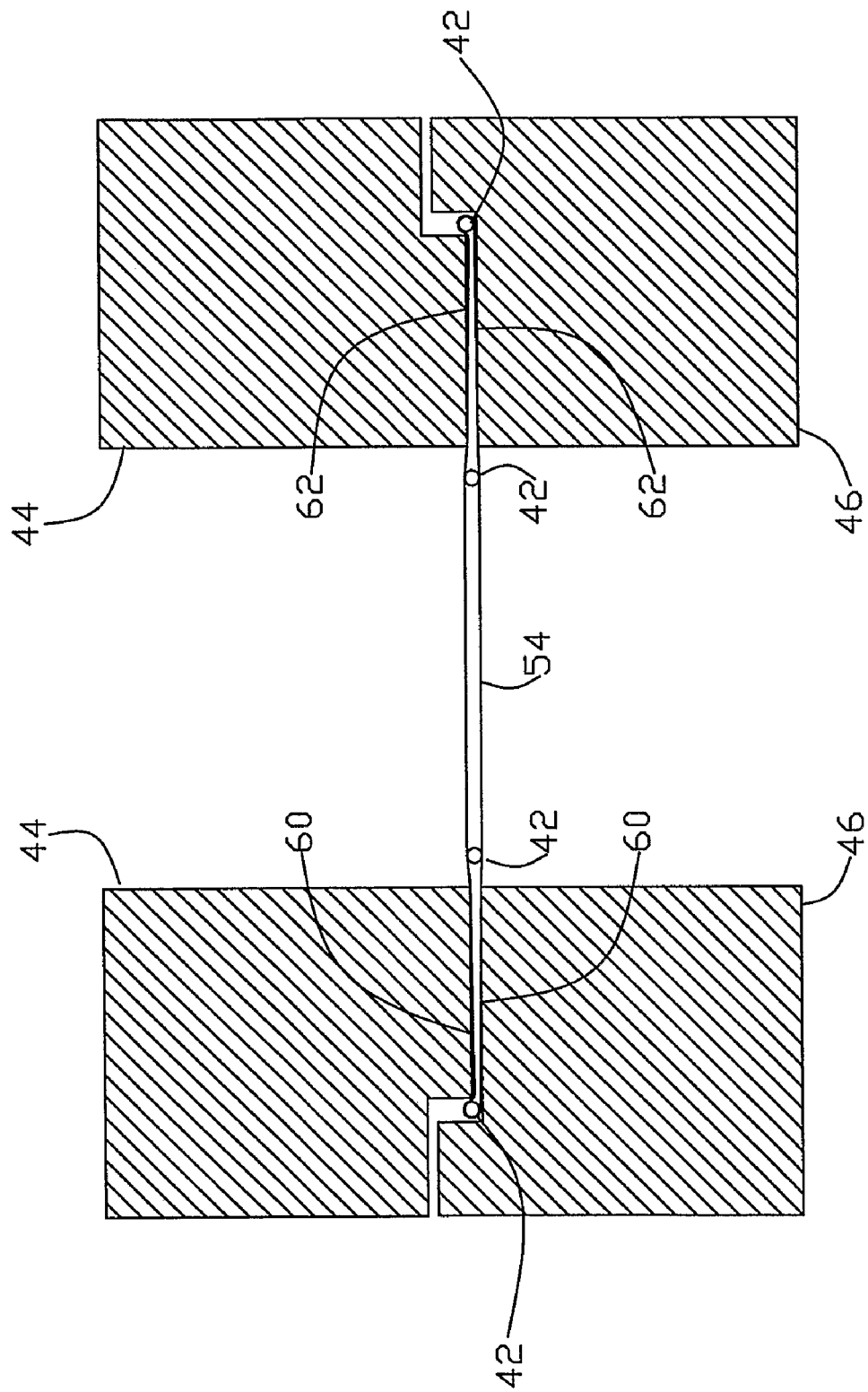
FIG. 6a is a fragmentary sectional view taken along the line 6a-6a in FIG. 6.

Consider next the winding station 14 and its associated components. A stationary winding frame or platform 34 of the winding station includes a pair of stationary guides provided by grooved rollers 36 (see FIGS. 4, 5 and 7). These rollers 36 are mounted on brackets 38. Stationary posts 40 are disposed adjacent to the rollers 36 on the brackets 38. A pair of laterally spaced wires 42 are entrained around the rollers 36 and guided by the posts 40 to provide a winding frame. These wires 42 are also guided by diametrically opposite stepped rollers 44 and 46. These rollers are used to apply binding tapes along the edges of the windings in the binding station 16. The rollers 44 have grooves or notches which provide guidance for the wires 42 and maintain parallelism of the wires 42 in the winding frame ahead of the application rollers 44 and 46.

The wires 42 in the case of the static brush product 12 are retained within the windings to facilitate the flow of static electricity picked up by the bristles of the brushes and conducting the electricity to a discharge point, for example a grounded member of the frame of the machine containing a static brush.

The mechanism for supplying the wires 42 to the winding station 16 via the rollers 36 and the path of these wires is also shown in FIGS. 1-7. The wires 42 are drawn from wire supply reels (not shown) over paths defined by several rollers and separate sets of rollers 48 and 50.

The outside reaches 52 of the wires are part of the winding frame. These reaches 52 define the opposite ends of the loops 54. The reaches 52 are maintained in tensioned relationship between the tape application rollers 46 and the posts 40, thereby defining the winding frame. The path of the wires 42 from these reaches 52 is around their respective rollers 36 and thence through the insides of the windings at locations which are spaced inwardly from the outer ends of the loops 54. Since these loops are slit into side-by-side brushes immediately downstream of the application rollers 44 and 46, they do not interfere with the incoming wires 42. In other words the loops of strands are tensioned around the outside reaches 52 of the wires 42, and there is sufficient space and insufficient friction in the few loops 54 of the winding ahead of the roller sets 44 and 46 to interfere with the feeding of the wires. The wires 42 enter between the outside reaches of the winding frame along paths defined by the rollers 48 and 50 and the rollers 36 of the winding station.

The winding station is only a short portion of the path over which the product 12 or it was being fabricated. Support, such as shown in the above referenced patents, as provided by an endless mandrel or moving frame, is not needed thereby making it possible to draw fibers during winding from heavy stationary spools of very large capacity. Production shut down time to refill the machines with yarn or threads is minimized.

The binding station 16 utilizes pairs of adhesive tape 60 and 62 to bind the windings 52 into a band. Preferably these tapes are self-adhering adhesive tape which is commercially available. The sticky and adhesive side of the tapes 60 and 62 are wound on supply reels 64 and 66 for the tapes 60 and 62, respectively. Thus, adhesive release liner material of the tapes is on the side thereof which travels around the periphery of the application rollers 44 and 46. The sticky or adhesive side of the tapes 60 and 62 are presented to the loops adjacent to their side edges. As the application rollers press the tapes against the loops, they are compressed and bound by the opposed tapes 60 and 62. The width of the tapes depends upon the application for the static discharge brushes. The width of the tapes defines the free portion of the fibers of the brushes and may be wider or narrower depending upon the stiffness or thickness of the bristles dividing the fibers of the brushes. The bristles are provided by the slit loops of the windings 52.

After the windings are bound by the tape 60 and 62, they pass through the slitter station 20 defined by slitter wheels 68 and 70 which are disposed in overlapping relationship. The wheels 68 and 70 slit the loops by scissor cutting action. After slitting, the band is divided into two side-by-side brushes with sets of bristles provided by the loops which face each other but are separated by the slitter 20. These brushes contain the wires 42. Before slitting, the band is made of continuous loops as shown in FIG. 9a after slitting the loops are divided into side-by-side brushes as shown in FIG. 9b.

The transport station 18a and 18b then pulls the slit brushes. See also FIG. 10. Optionally, the sets of application rollers 44 and 46 may be driven so as to provide for part of the transport of the band prior to slitting. The application rollers 44 and 46 may be free running as shown. Spring mechanisms not shown may be used to apply downward forces on the rollers 44 and upward forces on the rollers 46 so as to compress the tapes 60 and 62 and adhesively adhere and bind them to and bind them with the loops 52 of the windings.

The transport or drive station is provided by sets of final application rollers 80 and 82 (See FIG. 8). These sets constitute the part 18a and 18b of the driving or transport station 18a. The lower ones of these rollers 80 and 82 may be free running and held stationary in support shafts (not shown). The upper rollers may be supported in pressure blocks 84 and 86 which apply pressure along diameters of the rollers 80 and 82 against the tapes 64 and 66 to aid in adhesion of the tape.

The portion 18b of the transport station is provided by opposed sets of endless belts 86 and 88 of elastic material entrained around rollers 90 and 92 which compress the slit brushes providing the product 12. These belts provide the principal driving force to pull the product along the path out of the apparatus where they be cut to length or wound on reels as shown in FIG. 3. In order to adjust the compressive force on the bands of product 12, tension blocks 94 may be moved in opposite directions toward and away from each other as indicated by the arrows 96. The insides of the belts 86 and 88 ride against the tension blocks 94 (see FIG. 10).

The stationary support 34 in the winding station 16 is provided in a manner to allow for the rotation of the spindle 30 and yet enable stationary support of the elements in the winding station including the wires 42, the rollers 36 and the posts 40 on their brackets 38. (See also FIG. 7). This is accomplished by incorporating a scotch yoke mechanism in the support box 34 from which pins 100 and 102 are reciprocated into and out of openings in a yoke 104. The yoke 104 is attached together with bearings for the shaft 28 which rotates the spindle 30 to the foundation frame 106 of the machine.

The details of the design of the support 34 including the scotch yoke mechanism in the support 34, and the attachment of the mechanism to a frame member 106 of the machine to provide rigid stationary support for the winding station, will become more apparent from FIGS. 11-14.

For purposes of adjustment of the lateral position of the rollers 36 on the brackets, they may be attached to a slide 110 by loosening and tightening screws 112 on the slide. The lateral position of the rollers 36 and therefore the width of the frame defined by the wires 42 may be adjusted. The support 34 is a box having an opening 114 with a cover 116 and a fitting 118 for lubricating oil. Side arms 120 from the box 34 have lateral openings containing the pins or rods 100 and 102. These rods reciprocate in bushings 122.

The rods are reciprocated in synchronism with the rotation of the spindle 30 such that one of the rods 100 (as shown in the FIGS.) is inside the support box 34 when the spindle 30 is passing through the space between the rod 100 and an arm of the yoke 104.

The yoke 104 is attached to a sleeve 128 in which the hollow tubular shaft 28 rotates. This is the shaft 28 that rotates the spindle 30. The sleeve 128 is attached to the frame support member 106 which provides rigid support for the winding station via the support box 34 and the arms of the yoke 104.

The support box 34, and therefore the winding frame and platform, is supported by the pins 100 or 102 as they are reciprocally driven by the scotch yoke mechanism in the support box 34.

The scotch yoke mechanism has a collar 130 in which a cam follower is provided by a ring 134 at the end of a stub shaft 136 disposed inside the opening 138 in the collar 130. (See particularly FIGS. 11 and 12). The inside end of the stub shaft 136 is carried in a bar 139 which rotates with the shaft. Since the stub shaft 136 is mounted eccentrically with respect to the end 140 of the shaft 28, which also drives the spindle 30, and since the motion of the stub shaft 136 is confined to the slot 138, the collar 130 reciprocates as the stub shaft 136 rotates around the end 140 of the spindle drive shaft 28. The path of the stub shaft 136 and ring 134 is illustrated by a circle 137. The pins 100 and 102 are attached to the collar 130 by being screwed into opposite sides of the collar 130. Therefore, the pins 100 and 102 reciprocate as the stub shaft 136 is driven around the spindle drive shaft 28. The pins 100 and 102 move into and out of the openings 140 and 142 which are disposed in the stationary yoke 104 to receive these pins 100 and 102. Rigid support due to the rigidity to the yoke 104, is therefore afforded for the support 34 and the stationary part of the winding station.

From the foregoing description it will be apparent that there has been provided improved apparatus and methods for making products with filamentary material (yarn, thread etc.) by wrapping for winding the material into continuous successive loops. Variations and modifications in the herein described apparatus and methods, with the scope of the invention, will undoubtedly become apparent to those skilled in the art. For example, instead of wires to provide the winding station and the stationary support for the windings at the start of the process of making the product in the machine, a stationary tongue may be provided extending from the support 34. This tongue may be used as a guide for backing strips. The backing strips may be attached as by ultrasonic welding to the edges of the loops in the manner similar to backing strips used to make the pile weatherstripping in the Horton and Johnson et al. patents referenced above. The assembled bands of loops may be driven through the slitting and driving stations and outputted as completed product, for example, pile weatherstrips, from the end of the path. Other variations and modifications will certainly suggest themselves to those skilled in the art. Accordingly, the foregoing description should be taken as illustrative and not in a limiting sense.

The invention claimed is:

1. An apparatus for making an article having windings of filamentary material which comprises a frame on which said windings are made and from which successive ones of said windings are transported to provide a band of said windings, a pair of movable filaments laterally spaced from each other and around which ends of loops of said windings are disposed, and a spindle rotatable around said frame, said spindle having an end from which said filamentary material emanates to form said windings as said spindle rotates, a shaft rotating said spindle, a support for said frame in which said shaft rotates a member separated from said support by a gap through which the spindle rotates which prevents rotation of said support and said frame with respect to said shaft.

2. The apparatus according to claim 1 wherein said movable filaments define a winding platform receiving and supporting a plurality of said windings.

3. The apparatus according to claim 2 further comprising guides presenting bindings at the ends of said loops leaving said platform, said bindings assembling said windings into said band.

4. The apparatus according to claim 3 wherein said bindings are strips of material attached to said ends of said loops.

5. The method according to claim 4 wherein said guides comprise rollers applying tapes adhering to opposite sides of said loops, said tapes providing said bindings.

6. The apparatus according to claim 3 further comprising members in driving relationship with said band transporting said windings and bindings assembled into said band in a downstream direction away from said platform around which said spindle rotates to provide said windings.

7. The apparatus according to claim 2 wherein said pair of filaments defining said platform is a pair of wires spaced separated laterally from each other on which ends of said loops constituting said windings are disposed.

8. The apparatus according to claim 7 wherein cylindrical posts around which said wires extend to define sides of said winding platform.

9. The apparatus according to claim 8 further comprising means for transporting said wires with said windings away from said posts.

10. The apparatus according to claim 9 further comprising guides carrying binding strips into engagement with said loops along said band capturing said loops and said windings and assembling said windings into said band.

11. The apparatus according to claim 10 further comprising at least one drive member in engagement with said loops when assembled into said band for transporting said band in a direction away from said posts.

12. The apparatus according to claim 11 further comprising slitters engageable with said loops when assembled into said band for separating said loops into at least one pair of side by side brushes containing bristles of said loops separated by said slitters.

13. The apparatus according to claim 1 further comprising at least one spool of said filamentary material statically disposed and stationary while said spindle rotates, said filamentary material feeds from said spool via said spindle as said spindle rotates to provide said windings.

14. The apparatus according to claim 13 further comprising a stationary member supporting said frame at an end thereof from which an end of a band of said windings proximal to said stationary member is disposed such that said spindle rotates around said stationary member.

15. The apparatus according to claim 14 further comprising a mechanism presenting reciprocating members movable into and out of supporting relationship with said stationary member in synchronous relationship with said rotating spindle and supporting said stationary member without interference with said spindle as said spindle rotates.

16. The apparatus according to claim 15 further comprising a shaft rotating said spindle, said mechanism translating rotation of said shaft into reciprocation of said reciprocating members.

17. The apparatus according to claim 16 wherein said mechanism is a scotch yoke mechanism.

18. The apparatus according to claim 13 wherein said at least one spool is one of a plurality of stationary spools from which separate strands of said filamentary material are payed out into said rotating spindle to provide said windings from a plurality of strands which are composited into a single composite strand.

19. The apparatus according to claim 18 further comprising a tubular shaft on which said spindle is mounted for rotation therewith, said spindle being tubular and having an opening therein in communication with an opening through said hollow spindle, said spindle and shaft providing a path therethrough for said strands from said spools, and a tapered opening in said hollow shaft into which said plurality of strands are received and composited by twisting into said composite strands.

20. A method of making a band constituted of successive windings of filamentary material disposed lengthwise along said band, said method comprising winding a plurality of loops of said filamentary material which emanates from a rotating member carrying a support therefore, which winding is on a frame at one end of a path, which frame is separated from said support by a gap through which said member rotates, said band being formed by said successive windings, providing said frame by moving a pair of spaced filaments, applying a binding to said windings to assemble said windings into said band, and transporting said band of bound windings outward from an end of said path opposite from said frame.

21. The method according to claim 20 said emanating step being carried out by rotating a spindle about said frame while restraining said frame from rotating once while said band is transported away from said frame.

22. The method according to claim 21 further comprising the step of delivering said filamentary material into said spindle for delivery outward from said spindle to form said windings from at least one stationary spool of said filamentary material.

23. The method according to claim 22 wherein said filamentary material are separate stands delivered from an array of stationary spools disposed upstream from said frame and delivered into said spindle to form said windings.

24. The method according to claim 22 wherein said method further comprises supporting said support carrying said frame in stationary relationship, with respect to said spindle, by reciprocating support members in synchronism with the rotation of said spindle such that said reciprocating members clear said spindle as said members reciprocate and said spindle rotates.

25. The method according to claim 24 said method further comprises rotating said spindle by a shaft, and translating rotation of said shaft into reciprocation of said support members for said support.

26. The method according to claim 20 further comprising proving said filaments with a pair of moving wires which define locations of opposite edges of loops of said winding.

27. The method according to claim 26 further comprising transporting said wires, and assembling said windings into said band while being transported by binding ends of said loops to define said band.

28. The method according to claim 27 further comprising slitting said loops to define at least one pair of brushes having bristles extending away from said bindings.

29. The method according to claim 27 wherein said binding is carried out by applying said binding in the form of tapes, and adhesively adhering said tapes along the opposite edges of said loops on outsides of said loops.

* * * * *